Patented Mar. 5, 1940

2,192,689

UNITED STATES PATENT OFFICE

2,192,689

DETERGENT AIDS AND METHODS OF PRODUCING SAME FROM TETRA-ISOBUTYLENE

Louis A. Mikeska, Westfield, N. J., assignor to Standard Oil Development Company, a corporation of Delaware No Drawing. Application January 3, 1938, Serial No. 183,139

15 Claims. (Cl. 260—512)

This invention relates to improved detergent aids and methods of preparing same, and it relates more particularly to the preparation of detergent aids by reacting together tetra isobutylenes, phenols, and a strong poly-basic mineral acid. This application is a continuation in part of my co-pending application Serial No. 109,676, filed November 9, 1936 now Pat. No. 2,162,269.

It is shown in the prior case that improved detergent aids may be prepared by reacting together olefins, phenols, and a strong polybasic mineral acid. It has been found that particularly valuable detergent aids are prepared when using the tetramers of isobutylene as the olefin in this preparation. These products are identified herein as tetraisobutylenes and the corresponding alkyl radicals as tetraisobutyls.

The tetraisobutylene may be prepared directly by polymerization of isobutylene. The reactions are in general difficult to control when tetraisobutylene is the desired product, and the yields thereof are low. For this reason it is usually preferred to polymerize isobutylene to di-isobutylene, and then polymerize this to tetraisobutylene.

The polymerization of isobutylene may be conducted in various ways. For instance, isobutylene or mixtures thereof, such as those present in refinery gases resulting from the cracking of high molecular weight hydrocarbons, may be polymerized merely by heating under pressure, e. g., a temperature above 900° F. and a pressure of 800 lbs. or more, or in the presence of contact masses, e. g., clay, charcoal, bauxite, silica gel, etc., or activated contact masses, e. g., charcoal impregnated with phosphoric acid, at slightly lower temperatures, e. g., 600 to 900° F., at slightly elevated pressures, e. g., 50 to 300 lbs. Polymerization may be accomplished at even lower temperatures, e. g., 100 to 300° F. or so, and at ordinary or elevated pressures at which the isobutylene is in liquid or vapor phase, by contacting the polymerizable olefins with a liquid catalytic agent such as sulfuric acid, phosphoric acid, or with sulfates or phosphates of various metals, e. g., zinc, silver, cadmium, aluminum, etc. The temperature and concentration of the catalyst are regulated so as to induce polymerization to obtain a maximum yield of liquid products boiling between the approximate range of 100 to 400° F. but with a minimum production of high-boiling tarry materials. Polymerization may also be carried out by means of catalysts of the active halide type, e. g., $AlCl_3$, $BF_3$, zinc chloride, titanium fluoride, and the like, and, in such cases, the temperature may be even lower than indicated in the previous method. For example, it may be as low or even lower than room temperature.

This polymerization step may satisfactorily be carried out by using as a raw material an olefine-containing fraction known in the petroleum industry as $C_4$ cut which contains generally 30 to 50% of olefines including, among others, 10 to 15% of isobutylene. A sample of $C_4$ cut had approximately the following composition:

| | Per cent |
|---|---|
| Isobutane | 15 |
| Beta-butylene | 18 |
| Isobutylene | 14 |
| Alpha-butylene | 7 |
| n-Butane | 46 |

Other sources of olefines are the fractions called "stabilizer overhead" and "stabilizer bottoms" which have approximately the following composition:

| | Percent in stabilizer | |
|---|---|---|
| | Overhead | Bottoms |
| Propane | 42.3 | 0.57 |
| Propylenes | 22.7 | 0.34 |
| Butanes | 1.2 | 16.58 |
| Butylenes | 0.8 | 8.80 |
| Pentanes | | 19.13 |
| Pentylenes | | 12.03 |
| Hexanes | | 16.83 |
| Hexylenes | | 10.12 |
| Residue | | 15.60 |

It is desired to use olefines of an average molecular weight of not more than 70, and preferably between 40 and 60. It is even more preferable to use isobutylene itself for the polymerization so as to obtain relatively pure polymers thereof. This is preferably accomplished by extracting isobutylene from $C_4$ cut by concurrently dispersing the $C_4$ cut through 60% sulfuric acid in an absorption vessel by means of porous thimbles by using superatmospheric pressure of about 40 lbs. and a temperature of about 90° F., a $C_4$ cut feed rate of about 2,000 gallons per hour and an acid feed rate of 300 gallons per hour. The acid extract is then separated and polymerized at about 212° F. to 250° F. with a 10–15 sec. time of contact. The polymer is separated from the acid and the latter is recycled to the absorber and the polymer is washed with caustic soda.

This polymer, which may amount to about 9% yield on the C₄ cut charged, contains about 70% di-isobutylene and 25% tri-isobutylene, with about 5% of either gaseous or heavier hydrocarbons.

Variations may be made in the extraction process such as by absorbing the C₄ cut in 65% sulfuric acid at 32° F. and polymerizing the extract at 180° F. The dimers, trimers, and higher polymers may be separated by fractional distillation. The pure tetramer is not distillable at atmospheric pressure without substantial decomposition; hence it is preferable to secure it as the distillation residue, or to distill it under a vacuum so that it boils below about 200° C.

While small amounts of tetra-isobutylene are prepared in the polymerizations described above, it is preferable to segregate a substantially pure di-isobutylene fraction from the polymerization products obtained by such processes, and to polymerize it separately to tetra-isobutylene. It is also preferable that such di-isobutylene fractions be substantially pure, as it has been found that other isomeric octenes, such as those formed by reaction of isobutylene with butene-2, give hexadecene polymers which are greatly inferior to the pure tetra-isobutylenes for the purposes of this invention. To this end the first polymerization products are distilled with careful fractionation, and the fraction boiling between about 212° and 218.3° F. is selected for further polymerization.

The polymerization of the di-isobutylene to tetra-isobutylene may be conducted, for example, by bringing the di-isobutylenes into contact with active clays. At temperatures of about 212° F. substantial depolymerization of the product results, and yields of the tetramer are low. An improved process is to use active clays at lower temperatures of the order of 100 to 125° F.

The phenol to be used according to the present invention may be phenol itself or derivatives, e. g., ortho-cresol or thio phenols, or, under some circumstances, a crude commercial product containing substantial quantities of phenol, for example, the crude phenol fraction obtained in the by-product distillation of coal. Also, polyhydroxy derivatives of phenols may be used, e. g., one or more of the dihydroxy benzenes or trihydroxy benzenes, or one may use mono- or poly-hydroxy derivatives of poly-nuclear aromatic hydrocarbons, e. g., alpha- or beta-naphthol, or one may use aryl-substituted phenols.

The sulfating agent is preferably either strong sulfuric acid (of 90 to 95% concentration) or fuming sulfuric acid, or liquid sulfur tri-oxide, e. g., 20% oleum. Although sulfuric acid is preferred, it is possible to use other strong polybasic mineral acids, such as chlor-sulfonic acid or phosphoric acid, under some circumstances.

The reaction is carried out at a temperature between the approximate limits of 0° and 160° F., preferably between the approximate limits of 100° and 140° F., and generally the temperature to be used varies indirectly with the concentration of the acid, i. e., the stronger the acid the lower the temperature, and likewise the temperature may vary to some extent, depending upon the type, molecular weight, etc. of the olefine polymer being treated, as well as the exact characteristics desired to be produced in the finished product.

Under some circumstances, it may be desirable to carry out the reaction in the presence of an inert diluent or solvent such as pentane, hexane or heptane or commercial petroleum ether.

In carrying out the present invention, the olefine polymer is first mixed with the phenol and then the sulfuric acid is added, cooling, if necessary, to keep the temperature from exceeding the predetermined maximum, e. g., from 120 to 160° F.

However, instead of reacting the olefine polymers, phenol and sulfuric acid simultaneously, the phenol may first be alkylated with the olefine polymer and the resulting product may be treated with sulfuric acid.

By way of illustration only, and not desiring to be limited thereby, the following detailed specific example is given:

EXAMPLE I

A mixture of di-isobutylenes boiling between 212° and 218.3° F., obtained by careful fractional distillation of the polymers obtained on polymerizing isobutylene with 60% aqueous sulfuric acid, was warmed to 100° F. An active clay, such as "Superfiltrol", was added in small portions with stirring until the temperature of the mixture began to rise. Stirring was continued, with such cooling as necessary to keep the temperature near 120° F. When the refractive index of the liquid reached 1.447, the liquid was drained off the clay and the light constituents were removed by distillation with steam. The residue after separating from water is a substantially pure mixture of tetra-isobutylenes boiling above 212° F. at 4 to 6 mm. of mercury absolute pressure. It may be further purified by fractional distillation under vacuum if desired, but the mixture obtained as described above is sufficiently pure for most purposes of this invention.

34 grams of phenol were dissolved in 130 grams of these tetra-isobutylenes. 50 grams of ordinary concentrated sulfuric acid (66° Be.) were then added with rapid stirring at such a rate as to keep the temperature of the reacting mixture below 40° C. (104° F.). Cooling may be employed if desired. After all the acid had been added, agitation was continued for an additional 15 hours. At the end of this time 175 cc. of water and 50 grams of sodium sulfate were added with stirring. The mixture was allowed to settle, whereupon the aqueous solution of sodium hydrogen sulfate was drawn off and discarded. The reaction mixture was then neutralized with sodium hydroxide and steam distilled to remove alkali insoluble volatile impurities.

400 cc. of 91% isopropyl alcohol was then added, and the solution was extracted several times with naphtha to remove other alkali insoluble impurities. The alcohol solution was then evaporated to dryness. The residue was extracted several times with 98% isopropyl alcohol. The alcohol insoluble residue was discarded. The alcoholic filtrates were combined and evaporated to dryness. The residue consisted of a light colored product which weighed 104 grams.

This product consisted of substantially pure tetra-isobutyl phenol sulfonate sodium. It formed a clear solution in concentration of 0.2% in neutral water and in dilute sulfuric acid, and a slightly turbid solution in hard water.

The wetting number of this product was determined by the method of Draves and Clarkson (Proc. Am. Assoc. Textile Chem. Colorists 1931, 109). The average results of a number of tests are given in Table I below, in which results of tests on a number of salts of the sulfonates of alkylated aromatic compounds are given for comparison.

Table I

| Wetting agent | Wetting number, seconds concentration in neutral solution | | |
|---|---|---|---|
| | 0.2% | 0.1% | 0.07% |
| Tetra-isobutyl phenol sulfonate sodium (Example I) | 2 to 4 | 8 to 10 | 35 |
| Tri-isobutyl phenol sulfonate sodium | 10 | 46 | |
| Tri-isobutyl naphthalene sulfonate sodium | 56 | | |

In a 0.3% solution of sulfuric acid, the tetra-isobutyl phenol sulfonate sodium had wetting numbers, in 0.2% concentration, of 2.6 seconds, and in 0.1% concentration, of 13.4 seconds. In the same acid solution, tri-isobutyl naphthalene sulfonate sodium had wetting numbers, in 0.2% concentration, of 85.

Although substantially pure polymers such as tetraisobutylenes are preferred, it is also possible to use more or less mixed polymers such as those obtained by commercial polymerization of normally gaseous olefines into liquid polymers of similar boiling range, such as by heat and pressure alone or contacting with bauxite or other catalyst at elevated temperature and pressure, or by contacting wth sulfuric acid or other liquid phase polymerization catalyst. The polymers to be used should ordinarily have a molecular weight range between the approximate limits of 168 to 224. These polymers have highly branched carbon chains, with numerous short alkyl side chains, but should not be cyclic.

While it has been observed that when reacting triisobutylenes with phenol and sulfuric acid a substantial proportion of the resulting sodium salts are insoluble in naphtha or ether and have relatively high wetting numbers, it has been found that not more than 4 or 5%, and often not even an appreciable amount of the naphtha or ether-insoluble products are obtained from the tetra-isobutylenes. The entire reaction product from the tetra-isobutylenes thus has a much lower wetting number, and is usually suitable for use directly without further purification.

Although the exact limitations of the various factors involved in the preparation of detergent aids according to the present invention are not known with absolute certainty, the following ranges and preferred conditions are believed to be sufficiently definite to guide those skilled in the art in carrying out this invention. The strength of the sulfuric acid to be used should be between 85% $H_2SO_4$ and 20% oleum (fuming acid), and the stronger the acid the lower should be the temperature at which it is used, although generally, satisfactory results are obtained by using the ordinary concentrated sulfuric acid (95% $H_2SO_4$) at a temperature between 70° F. and 160° F. With stronger acid, the temperature may be lowered to 32° F. or even 15 or −5° F., using inert diluent, such as a straight run or hydrogenated naphtha, if necessary. The conditions of the reactions should be preferably maintained so as to produce primarily mono-alkali metal sulfonates and preferably no disulphonates.

The wetting agents prepared according to this invention may be used for a large variety of purposes, including among others: scouring agents, in conjunction with alkali, soap or both, dispersion of pigments and paints in water, in dye baths, penetration of cosmetics, wetting of glue, with Portland cement to get better mixing, finishing pastes, removing grease from steel in lubricating oils, in lacquer emulsions, in paper manufacture to give the paper better absorption qualities, in combination wtih derris and pyrethrum for use in sprays, to get best coverage and toxic action and may be used with lead arsenate in sprays, in oil and water emulsion sprays, and in miscible oils for the preparation of emulsions.

Proportions of the three primary reactants, i. e., the olefine polymers, the phenolic bodies and the sulfuric acid, may be varied considerably, but ordinarily the molal proportion of olefines to phenol should be between the limits of 4 to 1 and 1 to 1, and the ratio of sulfuric acid to phenol should be between the approximate limits of 3 to 1 and 1 to 1. The time of contact will, of course vary inversely with the temperature and concentration of acid, but ordinarily will be between the approximate limits of 10 minutes and 1 or 2 hours. Extremely short times of contact, e. g., substantially less than 1 minute, may be used with relatively concentrated sulfuric acid and at relatively elevated temperature.

Although sulfuric acid has been described above as the treating agent for effecting the combination of the olefine polymers with the phenols and simultaneously attaching an inorganic radical which imparts good wetting properties to the compound, other strong poly-basic mineral acids, e. g., phosphoric acid, may be used instead of sulfuric acid.

This invention is not to be limited by any of the specific examples given, nor any theories advanced as to the mechanism of the operation of the invention, but only by the appended claims in which it is intended to claim all novelty inherent in the invention as broadly as the prior art permits.

I claim:
1. Tetra-isobutyl phenol sulfonic acid.
2. Tetra-isobutyl phenol sulfonate sodium.
3. Alakali metal salt of a sulfuric acid derivative of tetra-isobutyl phenol, soluble in isopropyl alcohol, soluble in hydrocarbon oil, forming a clear solution, in a concentration of 0.2% in water, having pronounced wetting and detergent properties.
4. The process of preparing detergent aids which comprises reacting together a tetra-isobutylene with a phenol and a strong poly-basic mineral acid.
5. Process for preparing improved detergent aids comprising condensing tetra-isobutylene with a phenol in the presence of at least a molal equivalent of a strong poly-basic mineral acid with reference to the said phenol and neutralizing the resulting mineral acid derivative of the alkylated phenol with a water soluble base.
6. Process for preparing improved detergent aids comprising reacting together tetra-isobutylene, phenol and strong sulfuric acid, neutralizing the resulting sulfuric acid derivative of the alkylated phenol and separating therefrom the resulting salt of the acid derivative.
7. The process of preparing detergent aids which comprises polymerizing a mixture of olefines containing isobutylene into a mixture of polymers having molecular weights between 168 and 224, and reacting said mixture with a phenol in the presence of sulfuric acid, then neutralizing the resultant product.
8. The process of preparing detergent aids which comprises polymerizing di-isobutylenes boiling within the range of 100 and 103.5° C. to produce tetra-isobutylene, reacting said polymerization product comprising tetraisobutylene with a phenol and sulfuric acid at a temperature not substantially in excess of 160° F., and purifying the product by the further steps of neutralizing the resultant product with an alkali metal base to destroy excess acid and steam distilling the mixture to separate therefrom salts having a wetting number below about 25 seconds.

9. Process according to claim 8 in which the olefine polymer is used in a molal proportion between the approximate limits of 1 part and 4 parts to every 1 part of the phenol and in which the amount of sulfuric acid used is between 1 and 4 parts by weight for every 1 part of the phenol.

10. The process according to claim 8 in which the polymer used is an iso-olefine polymer having a molecular weight between the approximate limits of 168 and 224.

11. The product made by the process defined in claim 7.

12. The product of the process defined in claim 8.

13. A detergent aid particularly useful as a wetting agent comprising essentially a mono-alkali metal sulfonate salt of a reaction product of a tetra-isobutylene and a phenol.

14. A wetting agent comprising essentially a mono-alkali metal sulfonate of a reaction product of tetra-isobutylene and phenol.

15. The process of preparing detergent aids which comprises polymerizing di-isobutylenes boiling within the range of 100 and 103.5° C. to produce tetra-isobutylene, reacting said polymerization product comprising tetra-isobutylene with a phenol and sulfuric acid at a temperature not substantially in excess of 160° F., purifying the product by the further steps of adding sodium sulfate solution to yield sodium hydrogen sulfate from excess acid, drawing off and discarding the sodium hydrogen sulfate solution, neutralizing the resultant product with an alkali metal base and separating therefrom salts having a wetting number below about 25 seconds.

LOUIS A. MIKESKA.